(12) United States Patent
Allison et al.

(10) Patent No.: US 7,222,192 B2
(45) Date of Patent: May 22, 2007

(54) METHODS AND SYSTEMS FOR PROVIDING MOBILE LOCATION MANAGEMENT SERVICES IN A NETWORK ROUTING NODE

(75) Inventors: Rick L. Allison, Apex, NC (US); Peter Joseph Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 560 days.

(21) Appl. No.: 10/044,203

(22) Filed: Jan. 10, 2002

(65) Prior Publication Data

US 2003/0129991 A1 Jul. 10, 2003

(51) Int. Cl.
*G06F 15/13* (2006.01)

(52) U.S. Cl. .................. 709/245; 455/433; 455/564; 370/329

(58) Field of Classification Search ............ 709/30, 709/245; 455/456.1, 419, 433, 564; 370/329
See application file for complete search history.

(56) References Cited

U.S. PATENT DOCUMENTS

| | | | |
|---|---|---|---|
| 5,905,952 A | 5/1999 | Joensuu et al. | |
| 6,198,923 B1 * | 3/2001 | Buettner | 455/433 |
| 6,198,933 B1 * | 3/2001 | Lundin | 455/456.4 |
| 6,219,551 B1 | 4/2001 | Hentila et al. | |
| 6,324,399 B1 | 11/2001 | Salmivalli | |
| 6,327,350 B1 | 12/2001 | Spangler et al. | |
| 6,381,456 B1 | 4/2002 | Ko | |
| 6,400,943 B1 | 6/2002 | Montoya | |
| 6,411,632 B2 | 6/2002 | Lindgren et al. | |
| 6,456,845 B1 | 9/2002 | Drum et al. | |
| 6,505,050 B1 | 1/2003 | Brudos et al. | |
| 6,574,481 B1 | 6/2003 | Rathnasabapathy et al. | |
| 6,578,085 B1 * | 6/2003 | Khalil et al. | 709/241 |
| 6,662,017 B2 | 12/2003 | McCann et al. | |
| 6,735,441 B1 * | 5/2004 | Turgeon et al. | 455/433 |
| 6,738,362 B1 * | 5/2004 | Xu et al. | 370/329 |
| 6,952,582 B2 * | 10/2005 | Murai | 455/433 |

(Continued)

OTHER PUBLICATIONS

3GPP, "Universal Mobile Telecommunications System (UMTS); Super-Charger Technical Realization; Stage 2," ETSI, p. 1-28, (2001), no data.

(Continued)

*Primary Examiner*—Jinsong Hu
(74) *Attorney, Agent, or Firm*—Jenkins, Wilson, Taylor & Hunt, P.A.

(57) ABSTRACT

Disclosed is a mobility management routing (MMR) node that performs location management signaling operations associated with mobile subscribers. The MMR node may also perform the signaling message routing functionality typically provided by a network routing node, such as a signaling system 7 (SS7) signal transfer point (STP) or an SS7-over-Internet protocol signaling gateway (SG). The MMR node caches mobile subscriber information extracted from messages transmitted between an HLR and a VLR and responds to some of the messages using the cached information. As a result, signaling message traffic and call setup time in a mobile communications network are reduced.

40 Claims, 10 Drawing Sheets

U.S. PATENT DOCUMENTS

2002/0026527 A1\* 2/2002 Das et al. .................. 709/245
2002/0037750 A1\* 3/2002 Hussain et al. ............. 455/564
2002/0065086 A1 5/2002 Vanttinen et al.
2004/0132449 A1\* 7/2004 Kowarsch ................ 455/432.1
2005/0043036 A1\* 2/2005 Ioppe et al. ............. 455/456.1

OTHER PUBLICATIONS

3GPP, "3rd Generation Partnership Project; Technical Specification Group Core Network; Gateway Location Register (GLR)—Stage 2," ETSI, p. 1-129, (1999), no data.

Opposition in European Patent Application No. 1 308 054 (Dec. 3, 2004).

A30808-X3245-X32-1-7618 (Information, Network Element, Home Location Register Authentication Center, Siemens 1998), no date.

A30808-X2769-X7-3-7618 (Information, Signaling, Overview CCNC, Siemens AG 1997), no date.

A30808-X3245-X17-1-7618 (Information, Network Element, Mobile-Service Switching Center, Visitor Location Register, Siemens AG 1996), no date.

A30808-X3245-X19-1-7618 (Information, Network Element, Equipment Identity Register, Siemens AG 1995), no date.

A30808-X3245-X18-1-7618 (Information, Network Element, Home Location Register, Authentication Center, Siemens AG 1995), no date.

A30808-X2769-X6-1-7618 (Information, Signaling, Overview CCNC, Siemens AG 1995), no date.

Bertrand, "Jambala Mobility Gateway-Convergence and Inter-System Roaming," Ericsson Review, No. 2, pp. 89-93 (1999), no date.

\* cited by examiner

US 7,222,192 B2

METHODS AND SYSTEMS FOR PROVIDING MOBILE LOCATION MANAGEMENT SERVICES IN A NETWORK ROUTING NODE

TECHNICAL FIELD

The present invention relates to methods and systems for providing location management functionality in a wireless communications network. More particularly, the present invention relates to methods and systems for providing location management services in a network routing node, such as a signaling system 7 (SS7) signal transfer point (STP) or and Internet protocol (IP) enabled SS7 signaling gateway (SG).

BACKGROUND ART

Within the wireless telecommunications industry, the current trend in network technology is divided between global system for mobile communications (GSM) and American National Standards Institute-41 (ANSI-41) based architectures. In many respects, GSM and ANSI-41 based networks are quite similar, with the primary differences between the two technologies relating to the protocols used to communicate between the various network entities and the operating frequencies of the communication handsets. In the near future, next generation network architectures, such as Universal Mobile Telecommunications Systems (UMTS) and General Packet Radio Service (GPRS), will likely provide the network infrastructure for large-scale wireless communications around the world. As such, even though the description herein relates primarily to GSM networks, it is understood that the present invention applies to other types of mobile communications networks, including ANSI-41, Personal Communication Services (PCS), UMTS, and GPRS networks.

A simplified GSM network architecture is illustrated in FIG. 1. As shown in FIG. 1 the exemplary GSM network environment includes a home network, generally indicated by reference numeral 100, and a visited network, generally indicated by the numeral 110. As used herein, the term "home network" is used to refer to the network in which an HLR storing the mobile subscriber's location and subscription information resides. The term "visited network" refers to the network in which a mobile subscriber is roaming. Home network 100 presented in FIG. 1 includes a home location register (HLR) 104 and a gateway mobile switching center (GMSC) 106. Similarly, visited network 110 includes a GMSC 112, a first mobile switching center (MSC) 114 and associated visitor location register (VLR) 116, and a second MSC 120 and associated VLR 122. Also illustrated in FIG. 1 are a pair of base station system (BSS) units 118 and 124, which are associated with MSC 114 and MSC 120, respectively.

An HLR is a database, used to store subscriber information for a particular GSM service provider's subscribers. Functionally, an HLR is linked through a signaling network to other service areas such that subscriber information may be efficiently shared between geographically diverse networks. This sharing of information facilitates seamless intra- and inter-network roaming. A VLR, like an HLR, is also a database that contains mobile subscriber information. However, a typical VLR is closely associated (and often co-located) with a specific MSC and stores information related to mobile subscribers currently being served by that MSC.

Again, the network elements described above (HLRs and VLRs) can be thought of as essentially databases or database processing nodes. Unlike these database nodes, MSCs and GMSCs are generally identified as network switching elements that support or process both signaling and bearer (e.g., voice) type traffic. Among their many functions, MSCs and GMSCs are responsible for determining which cell site will take possession of a call. Such handoff control is facilitated by a communication link between an MSC and an associated BSS. A GMSC may also provide connectivity to one or more foreign or remote networks; otherwise, MSC and GMSC functionality is very similar.

When a mobile subscriber roams within the coverage areas of different MSC nodes, standard GSM network location updating procedures are employed to keep the mobile subscriber's HLR informed of the current location of the mobile subscriber. For example, as mobile subscriber 126 shown in FIG. 1 roams from the service area associated with MSC 114 to that of MSC 120, a number of signaling messages are generated by and communicated between MSC 114, VLR 116, MSC 120, VLR 122, GMSC 112, GMSC 106, and HLR 104. Again, the goal of such signaling activity is to provide the mobile subscriber's HLR with the information necessary to locate the roaming mobile subscriber within a home or visited network and to provide the VLR with the information necessary to complete calls to the roaming subscriber. A detailed discussion of such location or call management signaling operations can be found in *The GSM System for Mobile Communications* by Michel Mouly and Marie-Bernadette Pautet, Cell & Sys 1992.

FIG. 2 is an exemplary signaling message flow diagram associated with a typical location update operation triggered by roaming mobile subscriber 126 shown in FIG. 1. When mobile subscriber 126 roams into the coverage area served by MSC 120, mobile subscriber 126 registers with MSC 120 (line 1), which triggers a location update transaction. VLR 122 generates a signaling system 7 (SS7) mobile application part (MAP) UpdateLocation signaling message, which is routed to the mobile subscriber's HLR 104 (line 2). The UpdateLocation message includes information identifying the new serving MSC and VLR (MSC 120 and VLR 122). The mobile subscriber's HLR 104 receives and processes the UpdateLocation message and, in response, sends the serving VLR information related to the roaming mobile subscriber 126 (line 3). This mobile subscriber information is conveyed to VLR 122 in a MAP InsertSubscriberData signaling message. VLR 122 receives and processes the InsertSubscriberData message and responds to HLR 104 with an InsertSubscriberData_Ack message (line 4). The location updating transaction is concluded when HLR 104 sends an UpdateLocation_Ack message to VLR 122 (line 5). HLR 104 informs former serving VLR 116 that mobile subscriber 126 has roamed into a new MSC/VLR service area. Consequently, the mobile subscriber's information may be deleted from the former serving VLR database. In a GSM network, such instructions are communicated to a VLR via a MAP CancelLocation signaling message. In Line 7, VLR 116 acknowledges that the location information has been deleted with a CancelLocation_Ack message.

In the network architecture described above, no information is shared between VLR nodes within the same visited network. As a result, each time a mobile subscriber roams from one serving MSC/VLR to another within the same network, a number of signaling messages must be routed back to the mobile subscriber's home network to access the mobile subscriber's HLR data. As the number of mobile subscribers increases and the amount of inter-network roaming increases, the inefficiency and costs associated with such an architecture become significant. Furthermore, there is presently a great deal of interest in so-called "micro-cell" wireless network architectures. Micro-cell wireless network architectures include a large number of relatively small base stations and MSC nodes, as opposed to current architectures, which employ a relatively small number of large base stations and MSC nodes. In such micro-cell architectures, MSC/VLR (or MSC/VLR functional equivalent) service areas may be greatly reduced in size. As a result, the frequency of roaming between MSC/VLR service areas may be significantly increased, along with the frequency of location updating type transactions in the network.

In response to the location updating issues described above, various entities in the wireless communication industry have proposed a solution known as a gateway location register (GLR). A detailed discussion of GLR functionality can be found in $3^{rd}$ *Generation Partnership Project; Technical Specification Group Core Network; Gateway Location Register (GLR)—Stage* 2 (Release 1999), 3G TS 23.119 v3.0.0 (2000–03), the disclosure of which is incorporated herein by reference in its entirety.

The above-referenced industry standards publication describes a GLR entity that receives and processes certain signaling messages in a mobile network. A GLR entity, as described, provides temporary local storage for subscriber information associated with non-home mobile subscribers roaming in the wireless network served by the GLR entity. That is, a GLR entity requests, receives, and temporarily caches information associated with a roaming mobile subscriber. The GLR entity distributes this information to VLR nodes in the local network as required. In essence, a GLR entity behaves in a manner similar to a VLR during transactions with an HLR and in a manner similar to an HLR during transactions with a local VLR.

While in theory such GLR functionality has the potential to significantly optimize location updating type transaction processing across network boundaries, the above-referenced industry standards publication does not address problems associated with implementing such an entity in a moble communications network. For example, adding a stand-alone GLR node to an existing wireless network would require an SS7 point code to be allocated for the GLR node. However, point codes are becoming a scarce and consequently valuable commodity. Also, many network operators do not wish to deploy new point codes unless absolutely necessary because it involves re-provisioning of other network nodes, and there are usually regulatory fees involved. Furthermore, SS7 routing rules within other nodes in the wireless network would also require modification to reflect the addition of the new GLR node to the network. From a network operations standpoint, the administration of a new GLR network element would also entail a significant amount of effort and cost. Therefore, there exists a long-felt need for a cost-effective, efficient solution to the location management problems of conventional mobile communications networks.

DISCLOSURE OF THE INVENTION

According to one aspect, the present invention includes a mobility management routing (MMR) node that efficiently performs both location management signaling operations associated with mobile subscribers and signaling message routing functionality typically provided by a network routing node, such as a signaling system 7 (SS7) signal transfer point (STP) or an SS7-over-Internet protocol signaling gateway (SG). The MMR node includes a communication module capable of transmitting and receiving signaling data packets over a network, as well as one or more databases that provide both home location register (HLR) and visitor location register (VLR) functionality. More particularly, the MMR node receives and caches HLR data, which is subsequently distributed to other nodes in the network as requested or needed. The MMR node also receives and temporarily caches VLR data, which is subsequently utilized as required. An MMR node may provide such functionality by intercepting mobile query and response signaling messages. That is, an MMR node may intercept, examine, and process certain signaling messages that are not explicitly addressed to a network address associated with the MMR node. Alternatively, an MMR may receive and process certain mobile signaling messages addressed to a network address that has been assigned to the MMR node.

Accordingly, it is an object of the present invention to provide a signaling message routing node that provides gateway location register (GLR) functionality, in addition to routing functionality, in a wireless communications network.

It is another object of the present invention to provide a signaling message routing node that can intercept, terminate and respond to certain mobile signaling messages that are used to communicate mobile subscriber location information between a visitor location register and a home location register.

It is another object of the present invention to decrease inter-network signaling message traffic associated with mobile subscriber location management.

It is another object of the present invention to provide a signal-transfer-point-like network element that includes an integrated GLR processor.

It is another object of the present invention to provide a signal transfer point (STP) or STP-like network routing element that includes an integrated GLR processor where the GLR processor and the STP share the same network point code.

It is another object of the present invention to provide a system and method for deploying GLR functionality in a wireless communications network without requiring the modification or re-programming of signaling message routing rules in other elements in the network.

Some of the objects of the invention having been stated hereinabove, other objects will become evident as the description proceeds, when taken in connection with the accompanying drawings as best described hereinbelow.

DETAILED DESCRIPTION OF THE INVENTION

Figure 1:
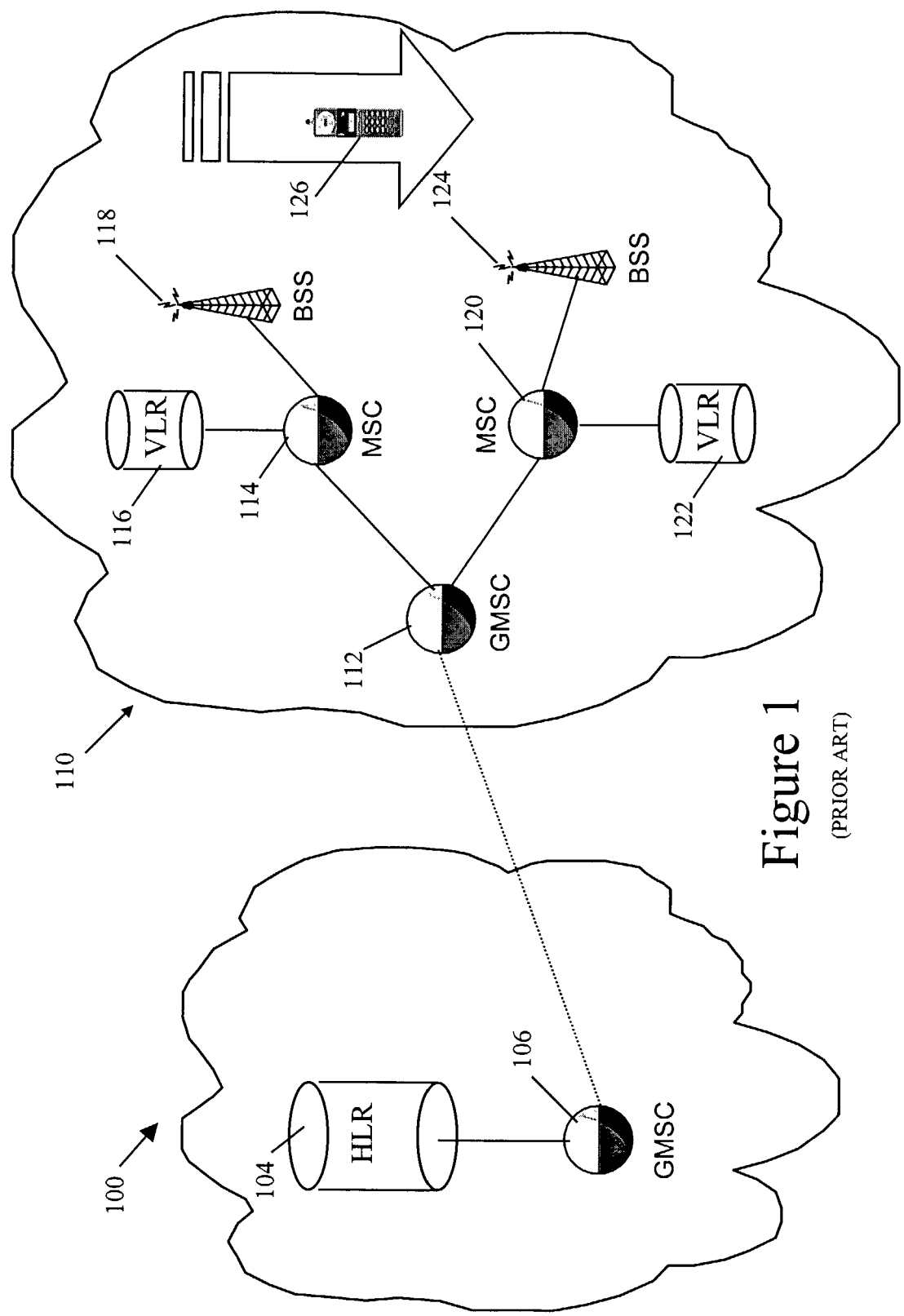
FIG. 1 is a network diagram illustrating a conventional mobile telecommunications network architecture and associated network elements.
Figure 2:
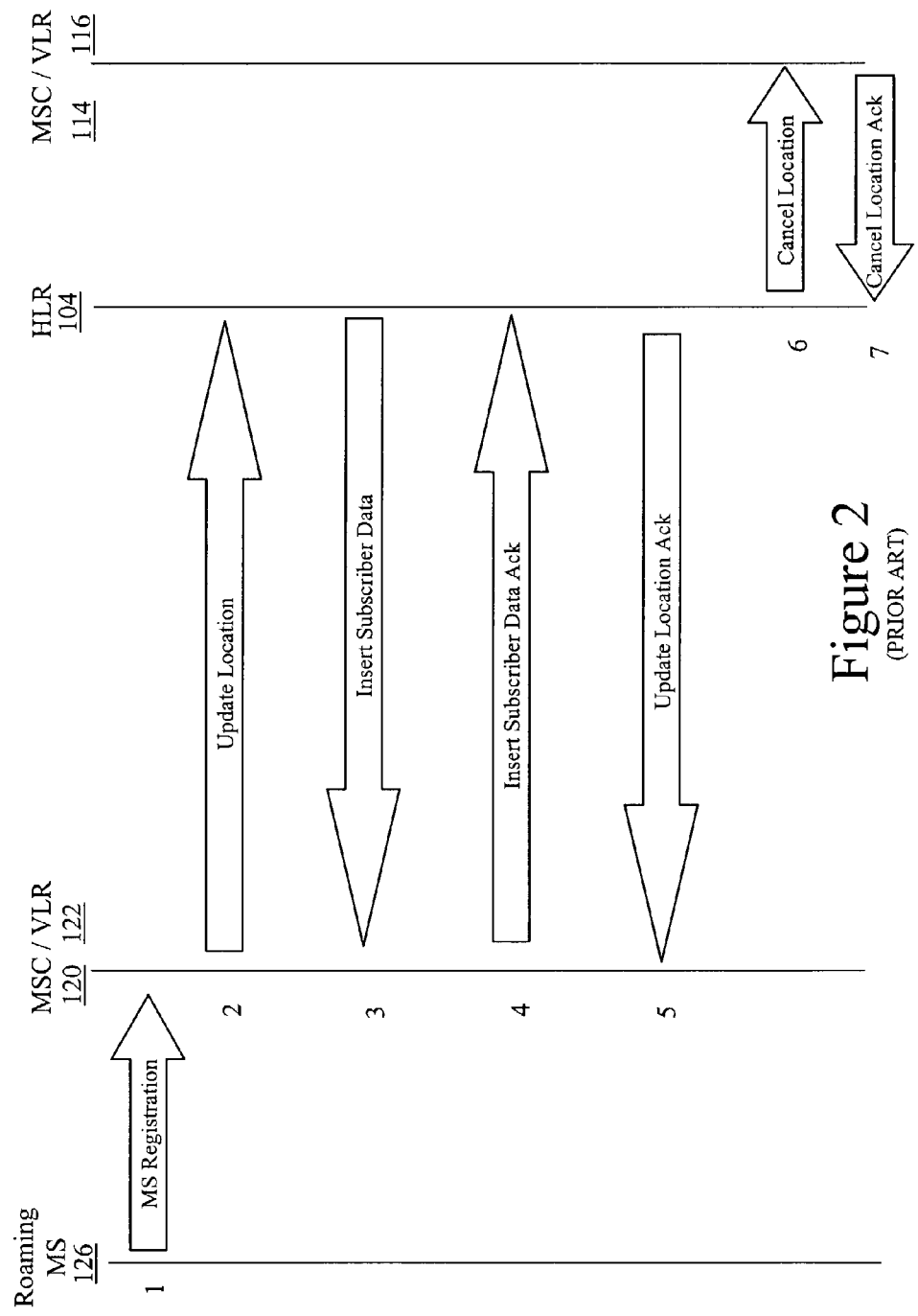
FIG. 2 is a message flow diagram illustrating an exemplary location management transaction involving several mobile telecommunications network elements.
Figure 3:
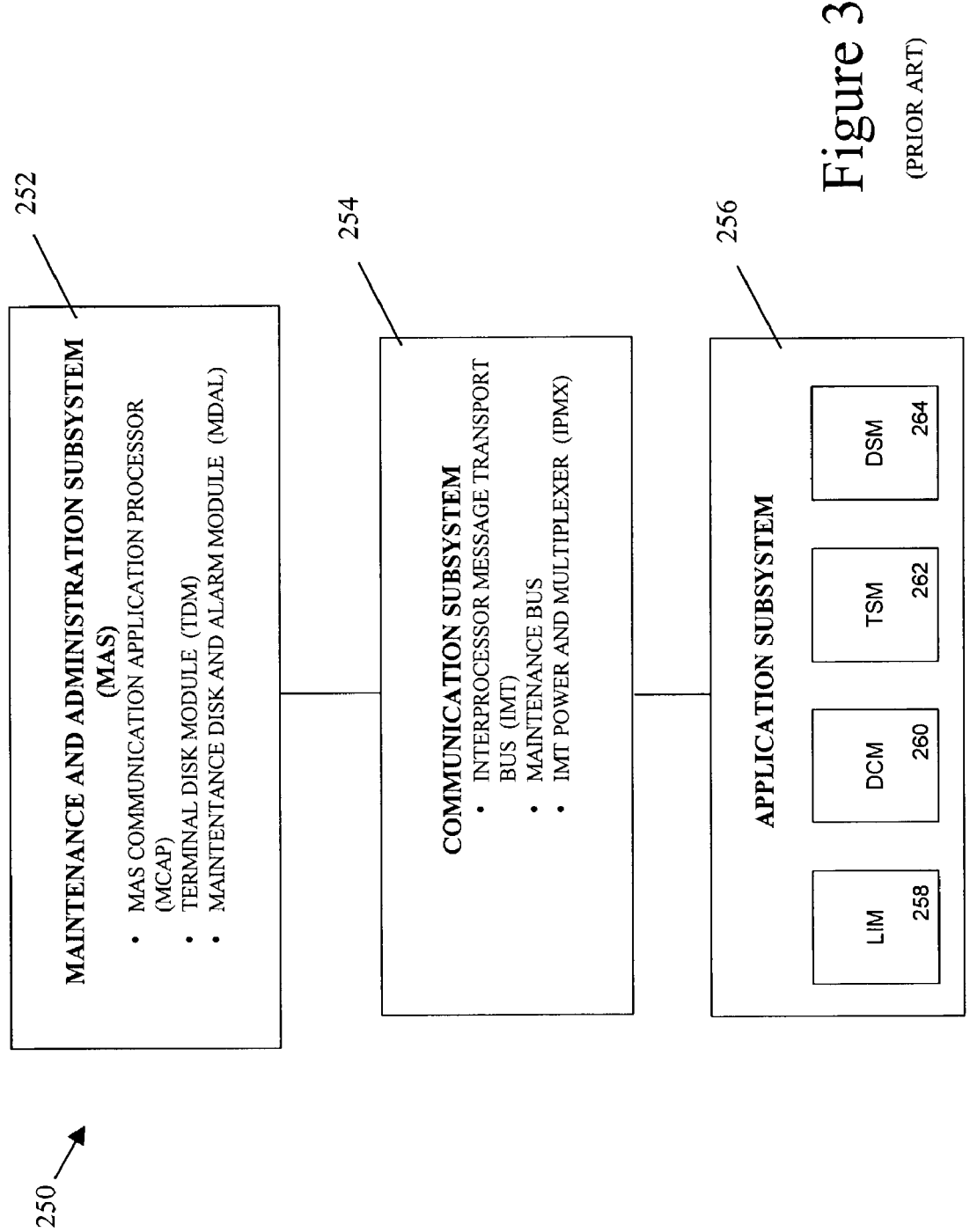
FIG. 3 is a schematic diagram of a conventional signaling gateway (SG) routing node suitable for use with embodiments of the present invention.

Disclosed herein are several embodiments of the present invention, which may include an underlying hardware architecture similar to that of a telecommunications network packet routing switch, such as a signal transfer point (STP) or a signaling gateway (SG) routing node. As used herein, the term "signaling gateway" refers to a packet routing node capable of routing call signaling messages between nodes of different protocols, such as signaling system 7 (SS7) nodes and IP-based signaling nodes (e.g., signaling nodes that communicate via SUA/M2UA/M3UA/SCTP, SIP/SDP, TALI, GPRS, etc.). An exemplary base architecture suitable for use with embodiments of the present invention includes the EAGLE® STP and the IP$^{7\text{TM}}$ Secure Gateway, both available from Tekelec of Calabasas, Calif. FIG. 3 is a block diagram of a signaling gateway architecture suitable for use with embodiments of the present invention. In FIG. 3, signaling gateway 250 includes the following subsystems: a maintenance and administration subsystem (MAS) 252, a communication subsystem 254 and an application subsystem 256. MAS 252 provides maintenance communications, program load, peripheral services, alarm processing and system disks. Communication subsystem 254 includes an interprocessor message transport (IMT) bus that is the main communication bus among all subsystems in the IP$^{7\text{TM}}$ Secure Gateway 250. This high-speed communications system may include two 1 Gbps counter-rotating serial buses.

Application subsystem 256 includes application cards capable of communicating with the other cards through the IMT buses. Numerous types of application cards can be incorporated into SG 250, including: a link interface module (LIM) 258 that provides SS7 links and X.25 links, an data communication module (DCM) 260 that provides a TCP/IP interface to an IP network, and an translation service module (TSM) 262 that provides global title translation, gateway screening and other translation services. A database service module (DSM) 264 may also be provided to support number portability service.

Mobility Management Routing Node Internal Architecture

Figure 4:
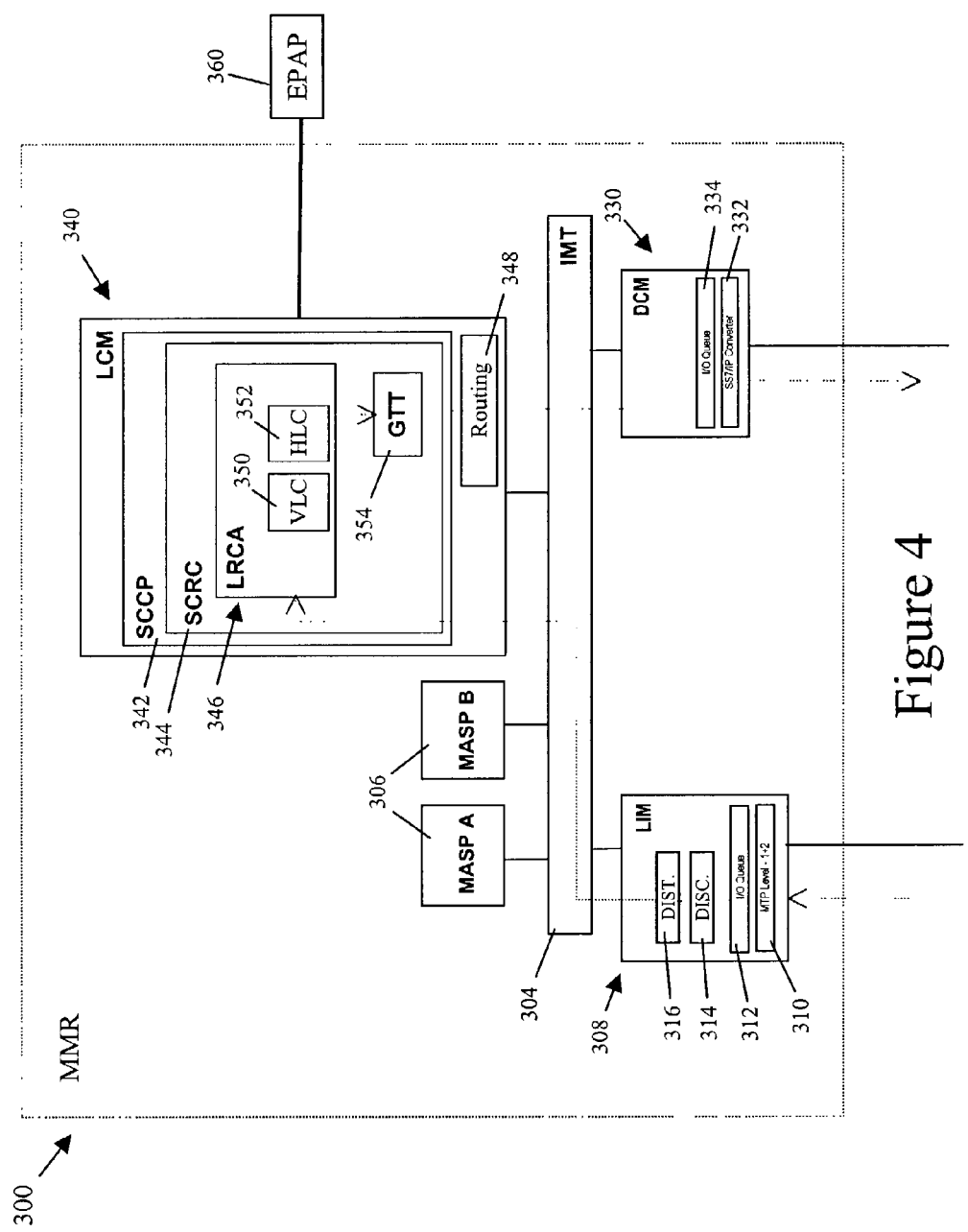
FIG. 4 is a block diagram illustrating an exemplary internal architecture of an MMR node according to an embodiment of the present invention.

FIG. 4 illustrates a mobility management routing (MMR) node according to an embodiment of the present invention. In FIG. 4, MMR 300 includes an interprocessor message transport (IMT) bus 304 that is the main communication bus among internal subsystems within MMR 300. In one embodiment, this high-speed communications system includes two 1 Gbps counter-rotating serial buses. A number of distributed processing modules or cards may be coupled to IMT bus 340. In FIG. 4, these cards include: a pair of maintenance and administration subsystem processors (MASPs) 306, an SS7 capable link Interface module (LIM) 308, an Internet protocol (IP) capable data communication module (DCM) 330, and a location caching module (LCM) 340. These modules are physically connected to IMT bus 304 such that signaling and other types of messages may be routed internally between active cards or modules. For simplicity of illustration, only single LIM, DCM, and LCM cards are included in FIG. 4. However, MMR node 300 may include multiple LIM, DCM, LCM and other cards, all of which may be simultaneously connected to and communicating via IMT bus 304.

MASP pair 306 provides maintenance communications, initial program load, peripheral services, alarm processing and system disks. Because MASP pair 306 is not particularly relevant to a discussion of MMR functionality, a detailed discussion of the design and operation of MASP pair 306 is not provided herein.

Focusing now on LIM card functionality, in the illustrated embodiment LIM 308 is comprised of a number of subcomponents including: an SS7 MTP level 1 and 2 module 310, an I/O buffer or queue 312, an SS7 MTP level 3 layer discrimination module 314, and a distribution module 316. MTP level 1 and 2 module 310 includes hardware and software for sending and receiving digital data over a particular physical medium. MTP level 1 and 2 module may also provide error detection, error correction and sequenced delivery of SS7 message packets. I/O queue 312 provides for temporary buffering of incoming and outgoing signaling message packets. MTP level 3 discrimination module 314 performs a discrimination function, effectively determining whether an incoming SS7 message packet requires internal processing or is simply to be through switched, i.e., routed to another node. In one embodiment, discrimination module 314 examines a service indicator octet (SIO) value in the received message packet in order to determine whether internal signaling connection control part (SCCP) processing is required. Distribution module 316 handles the internal routing of SS7 message packets that require additional processing prior to final routing.

DCM 330 shown in FIG. 4, includes an SS7/IP converter 332 and an I/O queue 334. Outgoing SS7 message packets routed through the DCM 330 will be transmitted out of MMR node 300 and into an Internet protocol (IP) network. Since the SS7 Message Transfer Part (MTP) communication protocol and the IP communication protocol are not inherently compatible, SS7 message packets that are to be transmitted via an IP network may be encapsulated within an IP routing envelope prior to transmission. In one embodiment, this IP encapsulation is performed by SS7/IP converter 332. DCM 330 may utilize any one of a number of protocols in communicating call signaling messages over an IP network, including the transport adapter layer interface (TALI) protocol, session initiation protocol (SIP), SS7 MTP2 user adaptation layer (M2UA), SS7 MTP3 user adaptation layer (M3UA), SS7 SCCP user adaptation layer (SUA), general packet radio service (GPRS) or other signaling protocols that may be transported via an IP based protocol. An exemplary protocol for communicating various types of SS7 messages in IP packets are described in IETF RFC 3094: Tekelec's Transport Adapter Layer Interface, April 2001, the disclosure of which is incorporated by reference herein in its entirety. In an alternate embodiment of the invention, DCM 330 may implement the stream control transmission protocol (SCTP), as described in IETF RFC 2960: Stream Control Transmission Protocol, February 2001, the disclosure of which is incorporated herein by reference in its entirety.

In general, an LCM card includes hardware and software for performing mobile subscriber location management functions and SS7 routing functions. LCM 340 shown in FIG. 4 includes a signaling connection control part (SCCP) sub-module 342, which further includes an SCCP level subsystem manager known as a signaling connection routing controller (SCRC) 344. SCRC 344 performs SCCP and mobile application part (MAP) level discrimination processing on incoming SS7 messages. SCRC may also direct screened messages to a location register caching application (LRCA) 346. LRCA 346 manages the processing of received signaling messages, generates new signaling messages, and administers or controls access to a visitor location cache (VLC) 350 and a home location cache (HLC) 352. VLC 350 stores information that identifies the mobile switching center (MSC) and visitor location register (VLR) nodes in a network that are currently supporting or have previously supported a given mobile subscriber. An exemplary VLC data structure is presented below in Table 1. As indicated in Table 1, VLC 350 may have one or more records, each of which includes a mobile subscriber identifier, such as a mobile subscriber ISDN (MSISDN) or international mobile subscriber identity (IMSI) number. Other functionally equivalent mobile subscriber identifiers, such as an electronic mail address (e.g., JohnSmith@Tekelec.com) or an Internet protocol address (e.g., 101.20.10.15) may also be used as a mobile subscriber identifier in VLC 350 according to an embodiment of the present invention. The sample VLC data structure shown below also includes a timestamp field that specifies the time and date of a given record or entry in the database, a VLR identifier field that identifies a serving VLR, and a MSC identifier that identifies a serving MSC.

TABLE 1

Sample Visitor Location Cache Structure

| Mobile Subscriber Identifier | Timestamp | | VLR Identifier | MSC Identifier |
|---|---|---|---|---|
| 9193457018 | 07-01-01 | 11:21.01 | 7075551000 | 7075552005 |
| 2024453045 | 07-01-01 | 11:15.23 | 7075551008 | 7075552001 |
| 7074679302 | 07-01-01 | 11:09.56 | 7075551008 | 7075552001 |
| 7074679302 | 07-01-01 | 10:27.41 | 7075551003 | 7075552007 |

A VLR identifier may be a point code and subsystem number, a global title address, an Internet protocol network address, a uniform resource locator, etc. Similar identifier formats may also be associated with the above mentioned MSC identifier field. In an alternate embodiment, VLC database 350 may store multiple VLR and MSC identifiers for each database entry.

HLC 352 stores information associated with a mobile subscriber that is typically requested by and/or provided to VLR nodes in a network. In one embodiment, HLC 352 may store some or all of the information contained in a MAP InsertSubscriberData signaling message. An example of such information is presented below in Table 2. A complete description of the content of a MAP InsertSubscriberData message can be found in *ETSI TS* 100 974 V7.6.0 (2000–09) *Digital Cellular Telecommunications System (Phase 2+); Mobile Application Part (MAP) Specification (3GPP TS* 09.02 version 7.6.0 Release 1998), the disclosure of which is incorporated herein by reference in its entirety. As indicated in the sample data structure shown in Table 2, an HLC may also include a timestamp that is associated with each record or entry and an HLR identifier.

TABLE 2

Sample Home Location Cache Structure

| Mobile Subscriber Identifier | Time Stamp | | Subscriber Status | HLR Identifier | SS Data List |
|---|---|---|---|---|---|
| 9193457018 | 07-01-01 | 11:21.01 | Service Granted | 9195551313 | CW ... |
| 2024453045 | 07-01-01 | 11:15.23 | Service Granted | 2025551414 | MPTY ... |
| 7074679302 | 07-01-01 | 11:09.56 | Service Granted | 7075556464 | CNAP ... |
| 7036559765 | 07-01-01 | 10:27.41 | Service Granted | 7035554848 | CNAP ... |

An HLR identifier may be a point code and subsystem number, a global title address, an Internet protocol network address, a uniform resource locator, etc. In an alternate embodiment, HLC 352 may store multiple HLR identifiers for each database entry. The HLC database structure presented in Table 2 is merely illustrative of one type of information maintained by an HLC according to an embodiment of the present invention. In practice, complete or partial copies of received MAP InsertSubscriberData (or functionally equivalent) messages may be stored within an HLC, which employs a significantly more complex data structure than that shown in Table 2.

Returning to FIG. 4, SCRC 344 further includes and controls access to a global title translation (GTT) module 354. In general terms, global title translation is a process where an identifier, which is not a valid network address, contained in a signaling message is used to obtain a valid network address that is suitable for routing the message through a signaling network. The valid network address may represent the final destination of the signaling message or the address of an intermediate network node, which will in turn be required to perform global title translation in order to continue routing of the message. Since GTT processing is well known to those skilled in the art of SS7 network design and operation, particularly those skilled in the art of signal transfer point design and operation, a detailed discussion of GTT processing is not presented herein. It should suffice to state that outbound messages that require intermediate or final global title translation during the course of MMR routing operations may be processed by GTT module 354.

As discussed above, LRCA 346 manages signaling transactions, which may include receiving, processing, modifying, terminating, and in generating new signaling messages. Signaling transactions may include transactions related to MAP or other mobility management messages, such as UpdateLocation, UpdateGPRSLocation, InsertSubscriberData, DeleteSubscriberData, CancelLocation, ProvideRoamingNumber, SendAuthenticationInfo, RegisterSS, SendRoutingInfo, FailureReport, ReadyForShortMessage, ForwardShortMessage, DeliveryReport, InformShortMessageDeliveryFailure, PurgeMobileSubscriber, Reset, RestoreData, ObtainMSCNumber, and SendRoutingInfoForLCS messages. The ability to terminate and generate these mobility management messages in an STP or IP/SS7 signaling gateway is an important aspect of the present invention, since STPs and SGs conventionally perform only routing and GTT functions and typically do not process MAP and other application level information. Message packets leaving SCRC 344 are received and further processed by a routing module 348. Routing module 348 is responsible for the routing outbound message packets from LCM 340 to an appropriate communication module (e.g., LIM, DCM) for transmission into a signaling network. Such routing may be performed using SS7 routing tables that map SS7 destination point codes to the processor or card associated with an outbound signaling link. For example, routing module 348 may extract a destination point code value from an outbound message, perform a lookup in its routing tables, obtain an address (e.g., an IMT bus address) for the card associated with an outbound signaling link over which the message is to be transmitted, and forward the message to the appropriate card via IMT bus 304. Thus, LCM 340 performs both location management and conventional SS7 routing functions.

Because MMR node 300 performs SS7 and IP routing functions and location management functions, MMR node 300 can replace an STP or SS7/IP gateway without requiring a new SS7 point code or an IP address. For example, MMR node 300 may assume the point code of the replaced node. In another embodiment, LCM 340 may be added as an upgrade to an existing STP or SS7/IP gateway, which would not require assignment of a new point code. Thus, one advantage of MMR node 300 is increased functionality without increasing the number of network nodes or using additional network addresses. LCM 340 may be coupled to an external provisioning application platform (EPAP) subsystem 360 via an Ethernet connection. EPAP subsystem 360 is responsible for administration and maintenance of the GTT database accessed by GTT module 354 and may also provide administrative access to VLC 350 and HLC 352.

Mobility Management Routing Node Operation

Before beginning a discussion of MMR node operation, it should again be noted that one object of the present invention includes minimizing mobile signaling message traffic between a visited mobile network and a mobile subscriber's home network. Such inter-network signaling typically involves communication and the exchange of information between a home location register in a mobile subscriber's home network and one or more visitor location registers in a network visited by the mobile subscriber. As such, an MMR node residing in a visited network may temporarily store or cache information that is typically accessed via queries to a mobile subscriber's home network, and, as such, minimize the number of queries that must be made to home the subscriber's network from remote networks. Information related to a mobile subscriber's location within a visited network are also maintained by the MMR node in order to facilitate the efficient processing and routing of inbound signaling messages arriving from the subscriber's home network.

The present invention is not limited to the location update transactions presented below. An MMR node according to the present invention may be used to reduce inter-network traffic for any suitable transaction related to HLR ⇔VLR communication (e.g. MAP_DELETE_SUBSCRIBER_ INFO, MAP_PURGE_MS, etc), including those described in the above-referenced GLR specification. Furthermore, an MMR node of the present invention is particularly well suited to provide such location register caching functionality as a result of the STP or STP-like processing capabilities that may be included in an MMR routing node, such as MTP routing, gateway screening, global title translation, etc.

Figure 5:
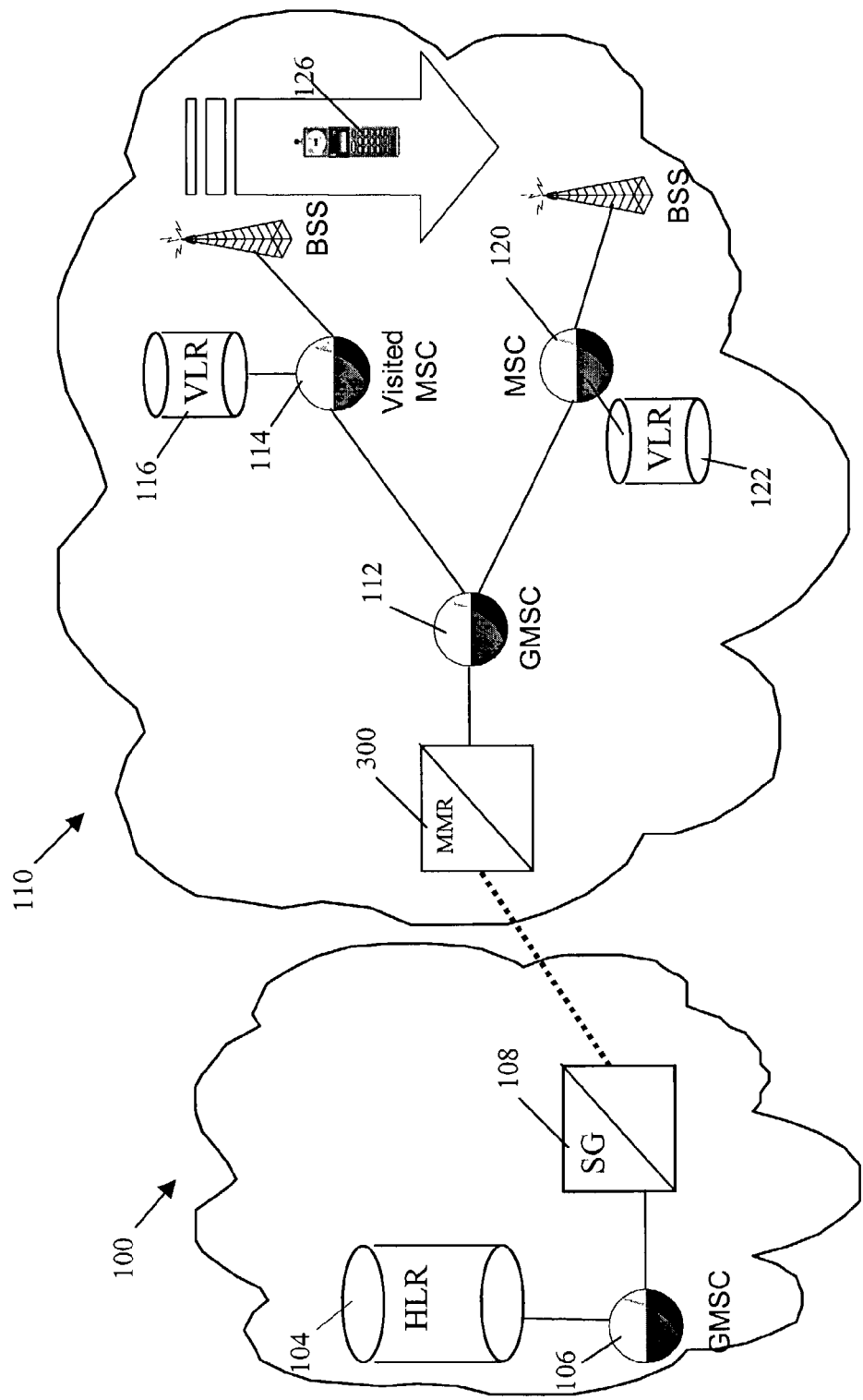
FIG. 5 is a network diagram illustrating an exemplary implementation of an MMR node in a mobile communications networking environment according to an embodiment of the present invention.

In any event, the functional block diagram of MMR node 300 shown in FIG. 4 may be used in combination with the network diagram presented in FIG. 5 to illustrate the operational aspects of the present invention. In FIG. 5, a mobile subscriber's home network is indicated by reference numeral 100 and a visited network is indicated by reference numeral 110. As such, home network 100, that is, the network to which the roaming mobile subscriber 126 belongs, includes a gateway mobile switching center 106, an Internet protocol capable signaling gateway 108, and a home location register 104. HLR 104 stores subscriber information associated with the mobile subscriber 126. Visited network 110 includes a GMSC 112, an MSC 114, an associated VLR 116, an MSC node 120, an associated VLR 122, and an MMR 300. SG 108 and MMR 300 may communicate with each other via the above-referenced TALI or SCTP protocols. In the illustrated example, SG 108 and MMR node 300 may communicate with other nodes via standard SS7 protocols. In an alternate embodiment, MMR node 300 may communicate with home network 100 via standard SS7 protocols. In such an embodiment, SG 108 may be replaced by an STP.

Initial UpdateLocation Processing

The first example of MMR routing node operation involves a relatively common aspect of mobile location management related signaling, which is a location update transaction. In a GSM network environment, a location update transaction involves a mobile application part (MAP) UpdateLocation signaling message. A detailed discussion of MAP UpdateLocation messages and their structure can be found in the above-referenced European Telecommunication Standards Institute (ETSI) MAP technical specification. In a general packet radio service (GPRS) network environment, a functionally similar UpdateGPRSLocation signaling message is utilized and would be processed in a similar manner by an MMR routing node of the present invention.

In the case of location update transactions in a mobile communications network, MMR processing can be divided into two scenarios. The first scenario involves the initial or first location update transaction associated with a particular mobile subscriber in a network served by an MMR routing node. In the example shown in FIGS. 5 and 6, this first scenario corresponds to a location update transaction initiated by VLR 116 when visiting mobile subscriber 126 first roams into network 110. The second scenario involves any location update transactions associated with the mobile subscriber that follow the first transaction. Again, in the context of the example illustrated in FIG. 5, the second scenario corresponds to a location update transaction initiated by VLR 122 after the first location update transaction initiated by VLR 116. In this case, the second location update transaction may be triggered as mobile subscriber 126 roams from the coverage area of MSC 114 to the coverage area of MSC 120.

In both scenarios discussed above, the location update transaction is initiated by a VLR. As such, communication of the MAP UpdateLocation signaling message from a VLR to the MMR routing node may occur either through direct addressing of the UpdateLocation message to the MMR node 300 or through an indirect addressing scheme. By indirect addressing, it is meant that MMR node 300 may intercept, process, terminate and respond to UpdateLocation messages that are not addressed directly to a network address of MMR 300. Both operational alternatives are described in the examples that follow.

With regard to direct addressing, an UpdateLocation message may be MTP addressed to an SS7 network point code and subsystem number that corresponds to the internal location register caching application of MMR node 300. That is, in one embodiment, MMR node 300 may receive such a direct addressed UpdateLocation message and use the point code and subsystem address information to determine that the message requires internal LRCA processing. Such a direct addressing scheme may be realized by requiring that all VLR nodes in a network served by an MMR node address all UpdateLocation signaling messages to the SS7 point code and appropriate subsystem of the MMR node. In a similar manner, VLRs in the network could address all UpdateLocation signaling messages to the SS7 point code of a node capable of performing global title translation (e.g., an STP, an SG, or a GTT-service control point and mark the message as requiring global title translation. In one embodiment, an MMR node may provide the STP-like GTT functionality and perform GTT processing on a received message, in addition to determining that a received message requires internal LRCA processing. Again, such message routing schemes may be achieved within the context of an SS7 network by addressing all UpdateLocation messages directly to the point code and subsystem of the MMR node and marking the message (i.e., routing indicator) as "route-on-subsystem," or by addressing all messages using a global title address that is indicative of the MMR node and marking the message (i.e., routing indicator) as "route-on-GT." Once again, an MMR may intercept and process mobility management messages that are not addressed to a point code and subsystem associated with the MMR.

Figure 6:
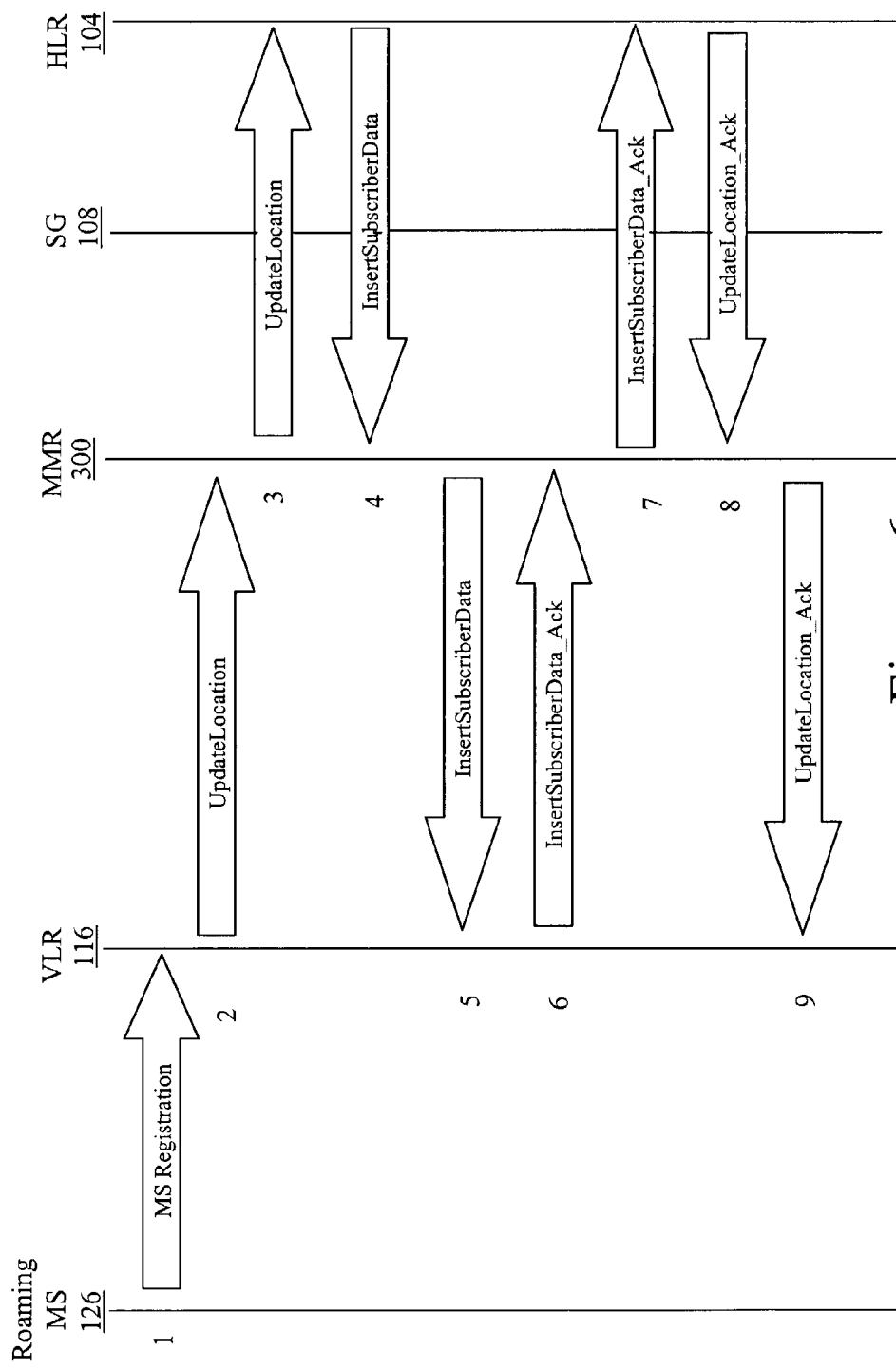
FIG. 6 is message flow diagram illustrating an exemplary initial UpdateLocation transaction involving an MMR node according to an embodiment of the present invention.

Referring to FIG. 6, in line 1, when a mobile subscriber first moves into an area served by MSC 114, the mobile subscriber's handset registers with VLR 116. VLR 116 generates an UpdateLocation message in response to the registration. In this example, VLR 116 addresses the UpdateLocation message to the point code and subsystem number of the MMR node 300 with the routing indicator (RI) in the message set to "route-on-SSN."

In line 2, VLR 116 sends the MAP UpdateLocation message to MMR node 300. Referring again to FIG. 4, the message is received within MMR node 300, the message may be received by LIM 308. SS7 MTP Level 1 and 2 processing is performed on the incoming signaling message packet by the MTP Level 1 and 2 module 310. With MTP Level 1 and 2 processing complete, the signaling message packet is temporarily buffered in the I/O queue 312 before being passed up the stack to the MTP Level 3 discrimination module 314. Discrimination module 314 examines the signaling message packet and determines that the packet is addressed to a point code and subsystem associated with the MMR node and that the message includes a signaling connection control part (SCCP) component (i.e., service indicator value of 3). As such, the packet is subsequently passed to the distribution module 316 for distribution to location caching module 340. The signaling message is placed on high speed IMT bus 304 and sent to LCM 340. More detailed discrimination may be necessary to determine the particular type of SCCP processing required. This additional discrimination may be performed at LIM 308 or at LCM 340. In this example, the additional discrimination is performed at LCM 340.

With regard to indirect addressing and message discrimination, in one such embodiment of the present invention, discrimination processing by discrimination module 316 would not include examining the destination point code and subsystem parameters contained in a received signaling message. Instead, HMDC 316 may be adapted to discriminate based simply on the service indicator value, while additional SCCP/MAP discrimination is again performed at an LCM card.

After being identified as requiring further SCCP processing, the UpdateLocation signaling message is received by LCM 340 and passed to SCCP module 342 where message verification and further discrimination processing are performed. Such additional discrimination processing may include examination of an SCCP message type field within the message. Within SCCP module 342, the message packet is passed to SCRC 344. SCRC 344 decodes and examines information contained within the signaling message in order to determine how the message should be processed. Information examined by SCRC 344 may include the SCCP calling party address (CgPA) and SCCP called party address (CdPA) fields of the received signaling message. A subsystem (SSN) parameter within the CdPA field may be examined to further identify the purpose of the message. For example, a CdPA:SSN value of 6 indicates that the message is intended for a HLR processing, a value of 7 indicates VLR processing, a value of 8 indicates MSC processing, a value of 5 indicates mobile application part (MAP) related processing, etc. In the context of the present example, SCRC 344 may further examine the message contents (e.g., a MAP message type parameter) so as to identify the message as being a MAP UpdateLocation message.

Having determined the received message to be an UpdateLocation message, a mobile subscriber identification number (e.g., MSISDN, IMSI, etc.) encoded within the UpdateLocation message is subsequently extracted and conditioned, as necessary. The mobile subscriber identification number is stored within the CdPA field in a field commonly referred to as the global title digits (GTD) parameter. In this example, the GTD parameter has a value of 9193457018 and it is further assumed that no conditioning of this number is required.

However, with regard to number conditioning, such processing may be necessary to ensure that the IMSI or MSISDN is compatible with the format of the key field data stored in VLC 350 and HLC 352. Number conditioning operations may include pre-pending extra digits to a mobile subscriber identification number contained within a signaling message packet to force the number to conform to an international format. Conversion of a mobile subscriber identification number from one numbering standard to another may also be performed. For instance, the mobile subscriber identification number associated with an incoming signaling message packet may be converted from a first industry standard format, such as E.214, to a second industry standard format, such as E.212, prior to database lookup operations. Such mobile subscriber identification number conditioning services may be necessary only in the case that the format of the incoming message mobile subscriber identification number is not consistent with the corresponding key field data format in the location register caching databases.

In any event, the MSISDN or IMSI extracted from the UpdateLocation message is used to perform a lookup in HLC 352. Since mobile subscriber 126 (i.e., MSISDN=9193457018) has not been previously registered in the visited network 110, HLC 352 does not contain an entry associated with the mobile subscriber, and consequently the lookup does not return a match. From this, the MMR knows that communication with the HLR is still required for this message (as opposed to the MMR being able to respond on behalf of the HLR).

A new entry for mobile subscriber 126 is next inserted into VLC 350. As indicated in Table 1 above, this new entry includes the mobile subscriber identification number, a timestamp, as well as serving VLR and serving MSC identification information extracted from the UpdateLocation message. Once the serving VLR and serving MSC information has been recorded in VLC 350, these parameters may be modified in the UpdateLocation message. That is, the serving VLR and serving MSC parameters may be changed to identifiers associated with MMR node 300. For example, an MMR node of the present invention modify the contents of a received message so as to reflect a pseudo-VLR identifier, MSC identifier, or HLR identifier that has been previously assigned to the MMR node. In such a case, subsequent communications from the mobile subscriber's HLR will be directed to MMR node 300. In an alternate embodiment, the serving VLR and serving MSC parameters need not be modified. In such a case, MMR node 300 may transparently intercept and examine all mobility management type signaling messages entering the visited network from a remote or foreign network. As such, explicit direction of subsequent signaling messages to the MMR node is not essential to the operation of the present invention.

In any event, once the VLC and HLC updates are complete, the UpdateLocation message is directed to GTT module 354, where global title translation processing is performed on the UpdateLocation message. The result of such GTT processing is a destination address to which the UpdateLocation message can be forwarded for delivery to the mobile subscriber's HLR.

This initial UpdateLocation message is GTT processed and routed from LCM 340 via the internal routing module 348 to DCM 330. DCM 330 encapsulates the UpdateLocation message within a transport adapter layer interface (TALI) packet, and applies an appropriate Internet protocol (IP) header.

Referring again to FIG. 6, in line 3, MMR node 300 transmits the packet via an IP network to SG 108 residing in the mobile subscriber's home network 100. SG 108 receives the TALI packet and extracts the encapsulated UpdateLocation message. SG node 108 routes the UpdateLocation message to HLR 104 where the message is processed.

In response to the receipt of the UpdateLocation message, HLR 104 generates and returns a MAP InsertSubscriberData message, which includes subscriber specific information associated with the mobile subscriber 126. The InsertSubscriberData message may be addressed via the serving VLR and/or serving MSC identifiers to MMR node 300. However, as discussed above, such direct addressing to the MMR node is not essential, because MMR node 300 may be programmed to intercept and examine all incoming mobility management type messages, regardless of the destination address.

In line 4, the InsertSubscriberData message is routed from home network 100 back to the visited network 110, where it is received by MMR node 300. Upon receipt by MMR node 300, the message is examined and internally routed to LCM 340 in a manner similar to that described previously with regard to the original UpdateLocation message processing. The InsertSubscriberData message is internally directed to the location register caching application 346 (LRCA), where a copy of some or all of the information in the message is stored in HLC 352, including the mobile subscriber identification number and a timestamp.

If the serving VLR and serving MSC identifiers reflect values associated with MMR node 300, LRCA 346 may reset these values to the original serving VLR and MSC entity identifiers using the serving VLR and MSC identifier information previously stored in the VLC database 350. If the serving VLR and serving MSC identifiers as sent by HLR 104 are correct, then the identifiers are not modified by LRCA 346. In either case, the InsertSubscriberData message is subsequently directed to GTT module 354 for address translation processing, and routing to the serving VLR 116 via routing module 348 and LIM 308 in a manner similar to that previously described (line 5).

Since the UpdateLocation and InsertSubscriberData transactions require confirmation service, serving VLR 116, upon receipt and processing of the InsertSubscriberData message, will generate a confirming InsertSubscriberData_Ack message. In the case of an initial UpdateLocation transaction, this message may be routed through to HLR 104 without requiring MMR processing (lines 6 and 7), because it will be addressed to the HLR and the MMR will know that the message should not trigger the LCRA. In a similar manner, upon receipt and processing of the InsertSubscriberData_Ack message, HLR 104 will generate a confirming UpdateLocation_Ack message and forward the UpdateLocation_Ack message to MMR node 300 (line 8). Once again, since the MMR is not terminating the initial UpdateLocation transaction, this message may be routed through to VLR 116 without requiring MMR processing (line 9). The example of confirmation and acknowledgment messaging illustrated in FIG. 6 assumes that successful UpdateLocation and InsertSubscriberData transactions have occurred. In the event of an unsuccessful transaction attempt, the HLR and VLR nodes may generate various error messages. However, because in the case of the initial UpdateLocation transaction, MMR node 300 is not terminating the transaction, such error messages would not be of particular significance with regard to the operation of MMR node 300.

Not shown in FIG. 6 is the subsequent CANCEL_LOCATION message, which HLR 104 sends to the previous VLR once the location update procedure with the new VLR 116 is successfully completed.

Subsequent Location Update Processing

Figure 7:
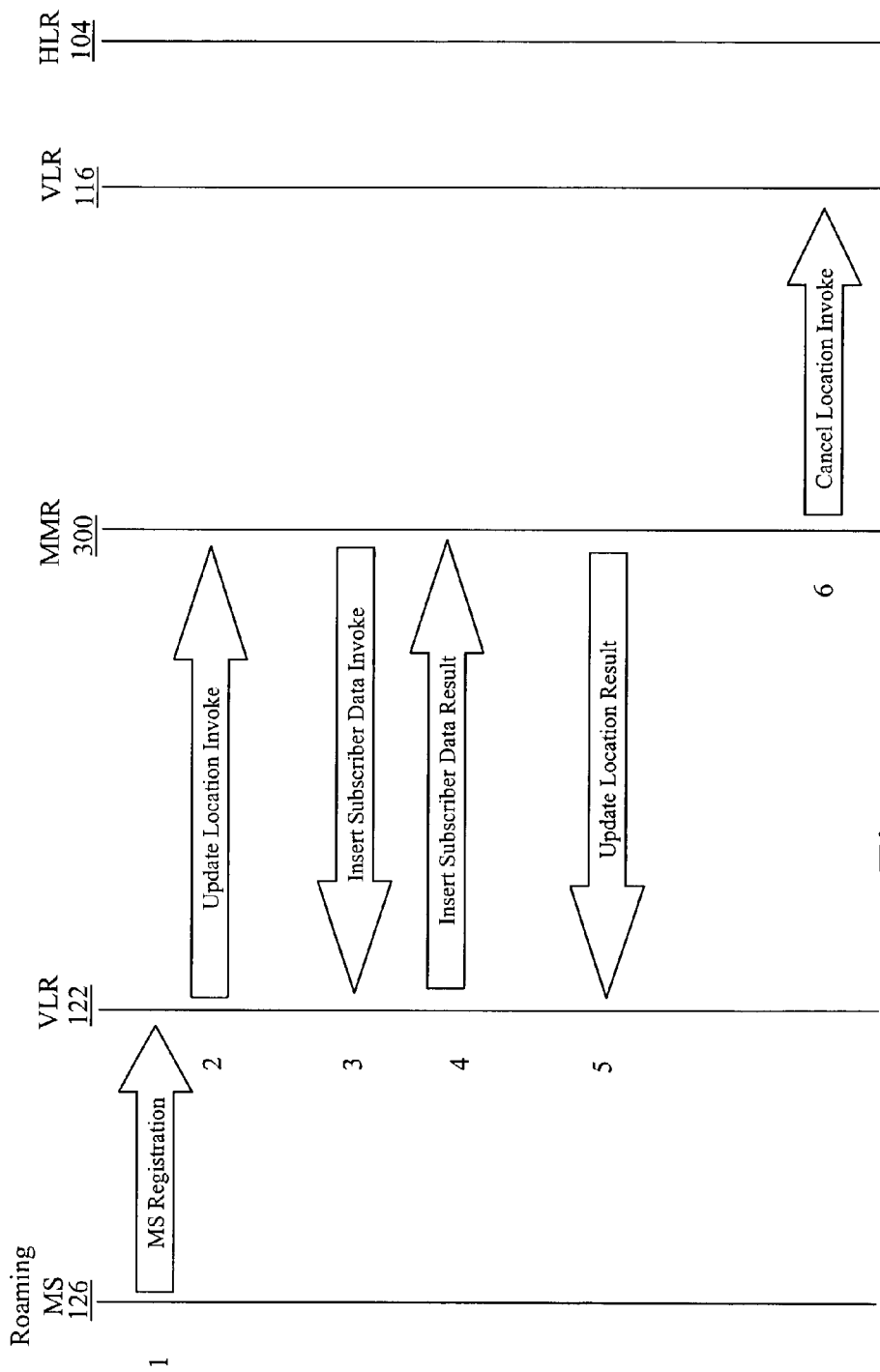
FIG. 7 is a message flow diagram illustrating an exemplary subsequent UpdateLocation transaction involving an MMR node according to an embodiment of the present invention.

The operation and benefits of an MMR node of the present invention will now be explained with regard to location update transactions that occur after the initial location update transaction. FIG. 7 is a message flow diagram illustrating a location update transaction after MMR node 300 has cached location information regarding a mobile subscriber from a previous location update transaction. As illustrated in the message flow diagram of FIG. 7, once the HLR data associated with mobile subscriber 126 is cached in MMR node 300, the forwarding of UpdateLocation queries generated by VLR nodes within the visited network 110 to the mobile subscriber's home network 100 is not necessary. In the case of subsequent transactions, these UpdateLocation and InsertSubscriberData transactions are terminated or originated by MMR node 300. To illustrate this point, a typical subsequent UpdateLocation transaction will now be described.

When mobile subscriber 126 roams from the service area of MSC 114/VLR 116 and enters the service area of MSC 120/VLR 122, the mobile subscriber's handset sends a registration message to MSC 120. In response, MSC 120 sends a registration message to VLR 122 (line 1). As a consequence of such registration activity, an UpdateLocation transaction will be initiated by new serving VLR 122. As described above, this UpdateLocation message may be addressed to MMR node 300, or the message may be intercepted during routing operations at MMR node 300. In line 3, the Update Location message is forwarded to MMR node 300. Within MMR 300, the UpdateLocation message is directed to location register caching application 346 (LRCA), where a lookup is performed in HLC 352 using a mobile subscriber identifier (e.g., MSISDN, IMSI, etc.) extracted from the message. In this case, a lookup in the HLC 352 returns the entry associated with mobile subscriber 126 that was previously inserted during the initial transaction. Because the HLC has a record of this subscriber with a valid timestamp, the MMR knows it does not need to communicate with the HLR in order to complete this transaction. Rather, the MMR can act on behalf of the HLR in communicating with the VLR. The HLR would still communicate with the MMR for messages it receives concerning this subscriber. In this way, the MMR is also acting on behalf of the VLR. As such, LRCA 346 extracts the mobile subscriber's information from HLC 352 and generates an InsertSubscriberData message containing some or all of the mobile subscriber's data that was stored therein. The InsertSubscriberData message is then passed to GTT module 354 for address translation processing and routing to the new serving VLR 122 via routing module 348 and LIM 308 (line 3).

Figure 8:
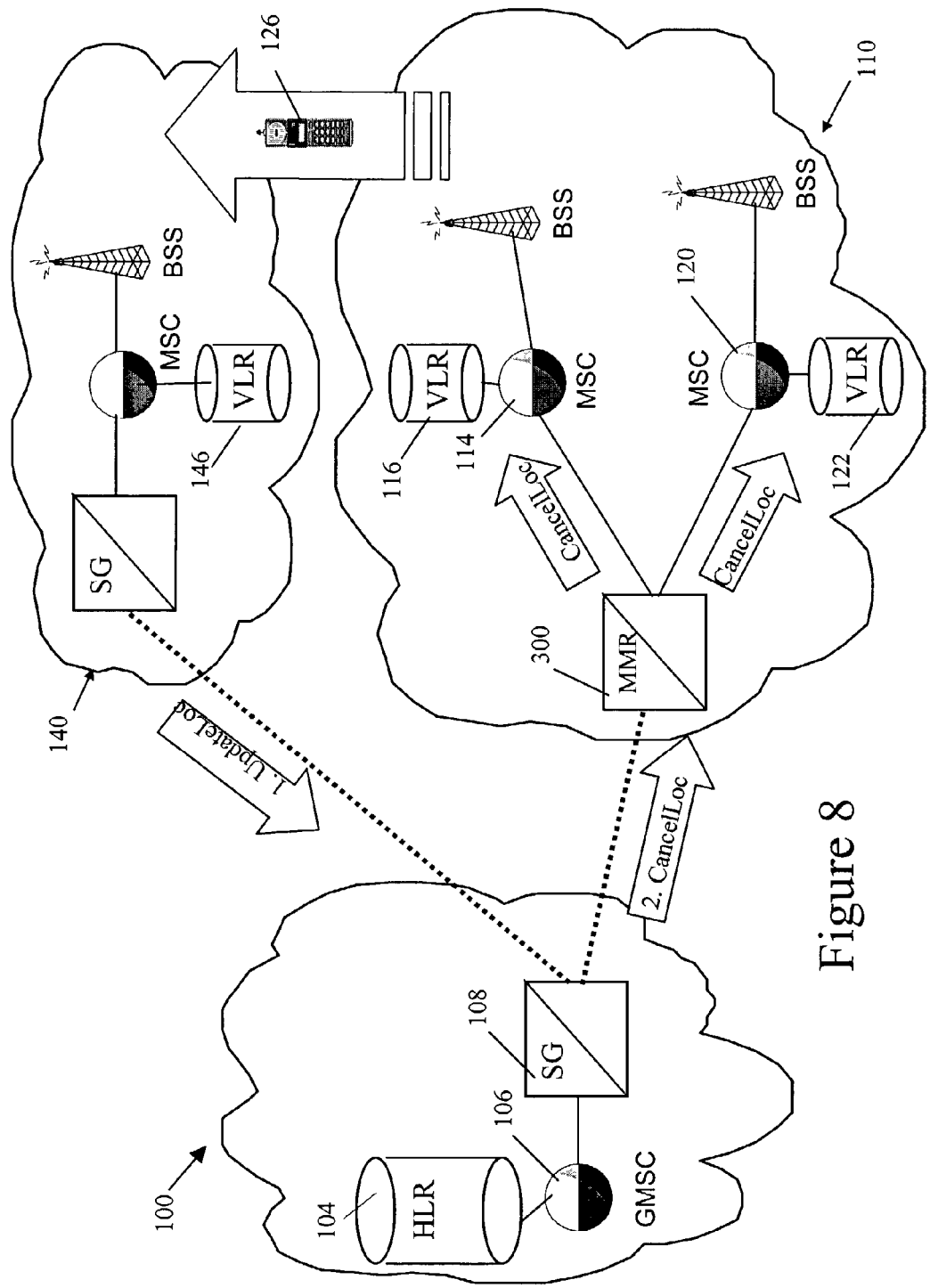
FIG. 8 is a network diagram illustrating an exemplary CancelLocation transaction involving an MMR node according to an embodiment of the present invention.
Figure 9:
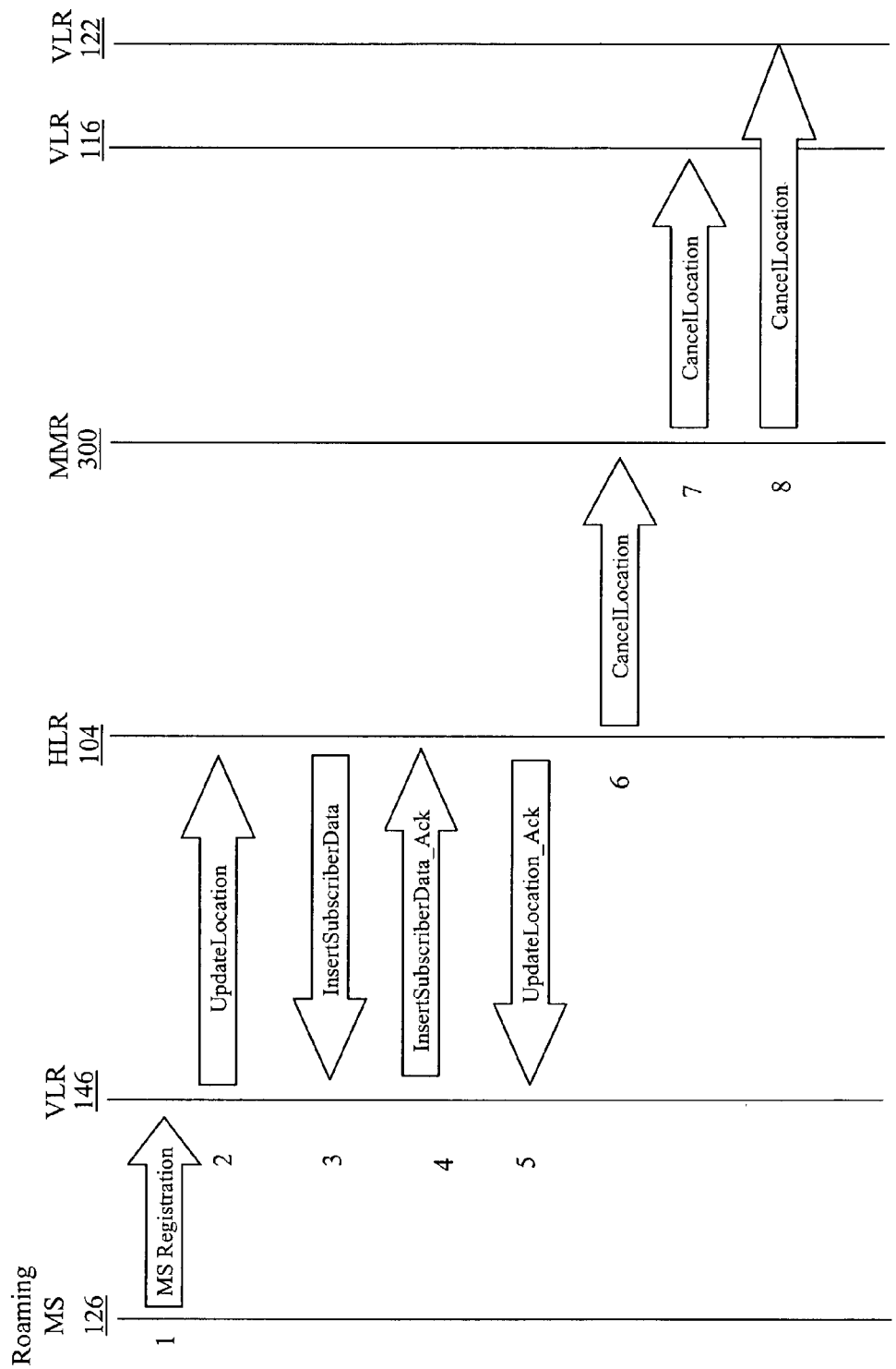
FIG. 9 is a message flow diagram illustrating an exemplary CancelLocation transaction involving an MMR node according to an embodiment of the present invention.

In a manner similar to that described above, a new entry for the mobile subscriber 126 is next inserted into VLC 350. As indicated in Table 1 above, this new entry includes the mobile subscriber identification number, a timestamp, as well as serving VLR and serving MSC identification information extracted from the UpdateLocation message. Because this is the second UpdateLocation message received for the mobile subscriber, an entry for mobile subscriber 126 already exists in VLC 350. This existing VLC entry includes a different timestamp and identifier information associated with the previously serving MSC 114 and VLR 116. Referring again to FIG. 7, the confirmed nature of the UpdateLocation and InsertSubscriberData transactions requires that the new serving VLR 122 respond to MMR 300 with an InsertSubscriberData_Ack (or appropriate error) message (line 4). Upon receipt of the InsertSubscriberData_Ack message LRCA 346 may complete the UpdateLocation transaction via the formulation of an UpdateLocation_Ack (or appropriate error) message, which is routed to the new serving VLR 122 (line 5). In one embodiment, MMR node 300 may then generate a MAP CancelLocation message using the information stored in the old or existing entry and forward the CancelLocation message to the previous serving VLR 116. This message informs the previous VLR 116 to purge the subscriber 126 from its database since it is now registered with a new VLR. This action is normally performed by the HLR, but in this case it is performed by the MMR on the HLR's behalf. However, other embodiments of the present invention may postpone the sending of a CancelLocation message and allow the old or existing entry to remain in the VLC even after a new serving VLR in the visited network has been identified. The reasoning and advantage of postponing the deletion of the subscriber data from the previous VLR is that if a subscriber is frequently switching back and forth between two VLR areas, then both VLRs can retain the information and do not have to initiate new location update procedures every time the roaming subscriber returns. For instance, if a subscriber is in the area serviced by VLR 116 and crosses into VLR 122's area, then ten minutes later crosses back into VLR 116's area, then five minutes later crosses back into VLR 122's area, this would normally require four separate full location update procedures. However, if the MMR uses the information it intercepted from the initial update to VLR 116 to perform the first update to VLR 122, and does not tell VLR 116 to cancel the subscriber's information, then when the subscriber crosses back into VLR 116's area, the full location update procedure is not required since VLR 116 still contains the subscriber's information. Rather, a "condensed" location update procedure is used that eliminates some of the messages normally required. This "condensed" procedure is described in detail in 3G TS 23.116 v3.0.0, Technical Specification Group Core Network; Super-Charger Technical Realisation; Stage 2 (Release 99). Likewise, since VLR 122 is not told to purge the subscriber's information, then a full location update procedure is not required when the subscriber returns to its area for the second time. Again, a "condensed" procedure is used that further reduces the signaling. Note that the HLR is not involved in any of the above transactions. If a message comes to the MMR from the HLR (in this case, the MMR is acting on behalf of the VLR), the MMR uses the timestamps associated with the data it receives as part of the "condensed" procedure to determine the valid VLR area that the mobile is currently associated with and passes this information to the HLR on behalf of the VLR. Such postponement may be based on a time interval (e.g., a statistically determined time interval, fixed time interval, etc.), or may rely on the receipt of a CancelLocation message from the mobile subscriber's HLR 104, when the subscriber goes to a new network not associated with MMR 300. Note the new network may or may not have MMR functionality. In such scenarios, one embodiment of an MMR node of the present invention may generate and distribute copies of a CancelLocation message to multiple VLR nodes in the visited network 110, as illustrated in FIGS. 8 and 9. That is, when mobile subscriber 126 roams out of visited network 110 and into another visited network 140, MS 126 registers the mobile subscriber with VLR 146 (line 1), and the new serving VLR 146 triggers an UpdateLocation. This UpdateLocation message will be routed to the mobile subscriber's HLR 104 (line 2) and the appropriate acknowledgement and InsertSubscriberData messages may be exchanged (lines 3–5). After processing the UpdateLocaitonmessage, HLR 104 will generate a CancelLocation message directed to the last known location (which in this case is MMR 300). This CancelLocation message is routed to the former visited network 110 and will be received by MMR node 300 (line 6). In response to the receipt of this CancelLocation message LRCA 346 may determine which VLRs in the network 110 have served mobile subscriber 126 using data stored in the VLC 350 and not yet received a cancel location. Once the former serving VLR information is extracted from VLC 350, copies of the received CancelLocation message may be generated and sent to all concerned VLR nodes (lines 7 and 8). Upon completion of such processing, entries associated with mobile subscriber 126 may be purged from both VLC 350 and HLC 352.

Mobile Terminated Call Processing

Figure 10:
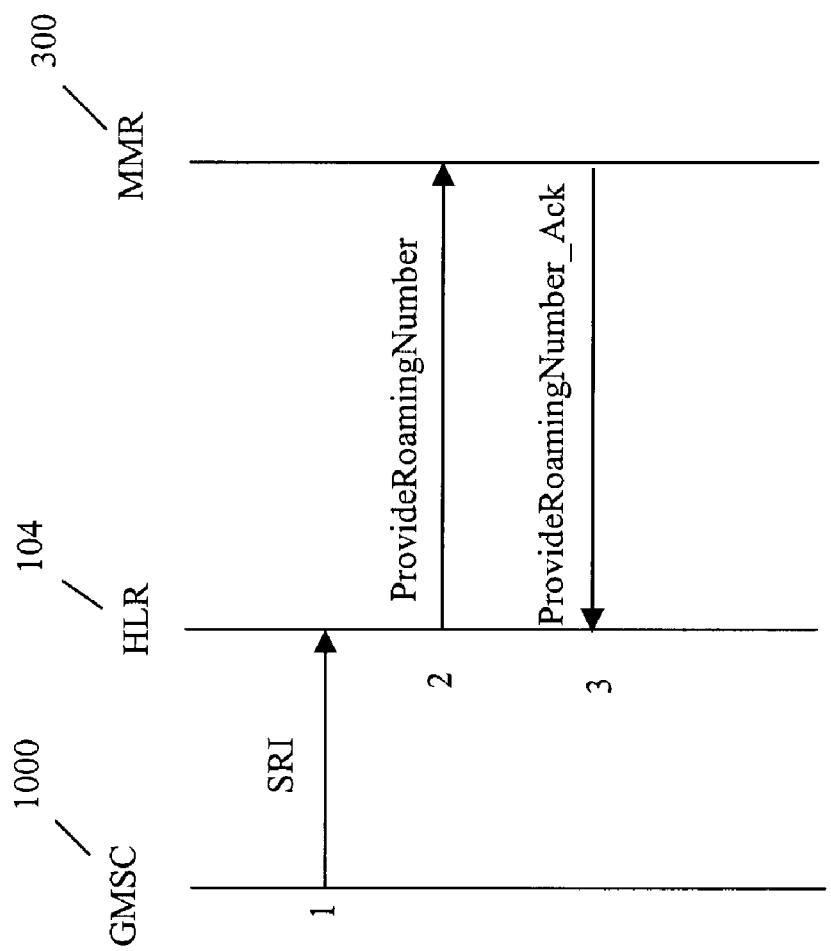
FIG. 10 is a message flow diagram illustrating an exemplary ProvideRoamingNumber transaction performed by an MMR node according to an embodiment of the present invention.

Another relatively common mobility management type transaction that is supported by a MMR routing node of the present invention involves a transaction sequence related to mobile terminated calls. FIG. 10 is a message flow diagram illustrating mobile terminated call processing involving an MMR node according to an embodiment of the present invention. In particular, during the course of call setup to a mobile subscriber roaming in visited network 110, the mobile subscriber's HLR 104 receives a routing information query (e.g., a MAP send routing information query message) from a gateway MSC 106 (or functionally equivalent node) that requires information related to the location of the mobile subscriber 126 (line 1). From the UpdateLocation transactions described above, the mobile subscriber's HLR 104 contains information that identifies the mobile subscriber 126 as being located within network 110. As such, HLR 104 may generate a MAP ProvideRoamingNumber message and subsequently route this message to network 110 (line 2). This message is normally destined for the VLR currently associated with the subscriber. However, MMR node 300 may receive the MAP ProvideRoamingNumber message and direct the message to the location register caching application 346 (LRCA) in a manner similar to that described above. LRCA 346 performs a lookup in VLC 350 using a mobile subscriber identifier (e.g., MSISDN, IMSI, etc.) contained in the ProvideRoamingNumber message and locates the most current entry based on the timestamp extracted from the UpdateLocation messages, as described above. With the most current entry located, the serving MSC and VLR information contained therein is used to ensure that the message is routed to the correct MSC and VLR. As such, the modified ProvideRoamingNumber message is routed from MMR 300 in a manner similar to that previously described (i.e., GTT processing is performed as necessary). MMR node 300 may relay the ensuing ProvideRoaming-Number_Ack (or error) message back to HLR 104, so that call setup operations may continue (line 3). Because MMR node 300 caches subscriber location information and responds on behalf of a VLR, network traffic and mobile terminated call setup time are reduced.

Mated MMR Node Synchronization

Another feature of the MMR embodiments described herein involves the issue of a mated pair deployment of MMR routing nodes in a mobile communications network. SS7 STP and SG nodes are most often deployed in mated pairs for load-sharing, reliability, and redundancy. As such, MMR nodes of the present invention may also be deployed in mated pairs for similar reasons. While the deployment of an MMR node of the present invention in mated pairs does not impact the core location register caching functionality described herein, some degree of synchronization or consistency must be maintained between the home location register and visitor location register caches residing in each of the mated MMR nodes. As such, MMR nodes deployed in mated pairs communicate information for maintaining database synchronization via a shared EPAP database administration system, such as that shown in FIG. 4. In an alternate embodiment, mated MMR nodes communicate information for maintaining database synchronization via a cross or "C" link type signaling connection that connects the two nodes.

Synchronization of the home register and visitor location register caches may occur by having one MMR of a mated pair send a copy of VLC and HLC database updates based on received signaling messages to its mate. The node that receives the database update from its mate may update its local HLC and VLC databases based on the information in the database update. If the timestamp in a received database update is less than a current timestamp in the receiving MMR's HLC or VLC, the receiving HLC or VLC may refuse to perform the update and send a database update to its mate. In this manner, synchronization between HLCs and VLCs of mated MMR nodes can be automatically maintained.

As described above, an MMR node according to embodiments of the present invention caches mobile subscriber information, performs both HLR and VLR functions, and performs SS7 routing functions. Such functions reduce the need for location update messages to be routed to the mobile subscriber's home network each time the mobile subscriber enters an area served by a new MSC within the same visited network. In addition, MMR node 300 may generate location cancellation messages to purge VLRs or HLRs of outdated location information. During mobile terminated call setup, MMR node 300 may respond on behalf of a VLR in response to ProvideRoamingNumber query messages. Thus, an MMR node according to the present invention reduces call setup time, decreases mobility management network traffic, and provides increased functionality over conventional STP and SS7/IP gateway nodes.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for mobile subscriber location management and for routing messages in a mobile communications network environment, the method comprising:

in a routing node separate from a home location register (HLR) and a visitor location register (VLR) and being located in a communication path between the HLR and the VLR:

(a) receiving signaling messages transmitted between the HLR and the VLR related to the location or subscription of a mobile subscriber;

(b) extracting mobile subscriber information from a first signaling message;

(c) caching the mobile subscriber information; and (d) using the cached information in the processing and routing of subsequent signaling messages transmitted by the HLR or the VLR relating to the mobile subscriber, wherein using the cached information in the processing and routing of subsequent signaling messages includes receiving a ProvideRoamingNumber message generated by the HLR in response to a request for routing information for a mobile terminated call to the subscriber and using the cached information to identify serving MSC and VLR information for the subscriber.

2. The method of claim 1 wherein receiving signaling messages includes receiving a mobile application part (MAP) UpdateLocation message.

3. The method of claim 1 wherein receiving signaling messages includes receiving a mobile application part (MAP) InsertSubscriberData message.

4. The method of claim 1 wherein extracting information from the first message includes extracting a mobile switching center (MSC) identifier that identifies an MSC serving the mobile subscriber.

5. The method of claim 1 wherein extracting information from the first message includes extracting a visitor location register (VLR) identifier that identifies a VLR currently serving the mobile subscriber.

6. The method of claim 1 wherein extracting mobile subscriber information from the first message includes extracting mobile subscriber information provided by the mobile subscriber's home location register (HLR).

7. The method of claim 1 wherein caching the mobile subscriber information includes storing the mobile subscriber information in a visitor location cache (VLC).

8. The method of claim 1 wherein caching the mobile subscriber information includes storing the mobile subscriber information in a home location cache (HLC).

9. The method of claim 1 wherein using the cached information in the processing and routing of subsequent mobile signaling messages includes using the cached information to generate an InsertSubscriberData message on behalf of an HLR in response to receiving an UpdateLocation message.

10. The method of claim 1 wherein using the cached information in the processing and routing of subsequent mobile signaling messages includes using the cached information to generate and route a ProvideRoamingNumber_Ack message on behalf of a VLR in response to a received ProvideRoamingNumber message.

11. The method of claim 1 wherein using the cached information in the processing and routing of subsequent mobile signaling messages includes using the cached information to process and route a received CancelLocation message.

12. The method of claim 11 including replicating the received CancelLocation message to multiple VLRs.

13. The method of claim 1 wherein performing steps (a)–(d) in a routing node includes performing steps (a)–(d) in a signal transfer point.

14. The method of claim 1 wherein performing steps (a)–(d) at a network routing node includes performing steps (a)–(d) in an SS7/IP gateway.

15. The method of claim 1 wherein using the cached information in the processing and routing of subsequent signaling messages relating to the mobile subscriber includes acting on behalf of the HLR in communicating with the VLR and acting on behalf of the VLR in communicating with the HLR.

16. A method for reducing location management message traffic in a mobile communications network, the method comprising:
   at a routing node separate from a home location register (HLR) and a visitor location register (VLR) and being located in a communication path between the HLR and the VLR:
   (a) receiving a first location update message in response to a first change in location of a mobile subscriber;
   (b) forwarding the first location update message to an HLR associated with the mobile subscriber;
   (c) receiving a message from the HLR including subscription information regarding the mobile subscriber;
   (d) caching the subscription information;
   (e) receiving a second location update message in response to a second change in location of the mobile subscriber;
   (f) in response to the second location update message, generating and routing a message on behalf of the HLR using the cached subscription; and
   (g) receiving a ProvideRoamingNumber message from the HLR generated in response to a request for routing information for a mobile terminated call to the subscriber and using cached location information to identify serving MSC and VLR information for the subscriber.

17. The method of claim 16 wherein receiving a first location update message includes intercepting a location update message addressed to the HLR.

18. The method of claim 16 wherein receiving a first location update message includes receiving a first location update message addressed to the routing node.

19. The method of claim 16 wherein forwarding the first location update message to an HLR includes changing an MSC and a VLR ID in the first location update message to values that correspond to the routing node.

20. The method of claim 16 wherein forwarding the first location update message to an HLR includes forwarding the first location update message without modifying MSC and VLR ID parameters in the location message.

21. The method of claim 16 wherein receiving a message from the HLR including subscription information includes intercepting a message addressed to a VLR.

22. The method of claim 16 wherein receiving a message from the HLR including subscription information includes receiving a message addressed to the routing node.

23. The method of claim 16 wherein receiving a second location update message includes intercepting a location update message addressed to the HLR.

24. The method of claim 16 wherein receiving a second location update message includes receiving a location update message addressed to the routing node.

25. The method of claim 16 wherein generating a message on behalf of the HLR includes generating the message without forwarding the second location update message to the HLR.

26. The method of claim 16 comprising replicating the cached information between databases of a mated pair of routing nodes.

27. The method of claim 16 wherein generating a message on behalf of the HLR includes generating an insert subscriber data message containing mobile subscriber subscription information and routing the insert subscriber data message to a VLR currently serving the mobile subscriber.

28. The method of claim 16 comprising, in response to the second location update message, generating a cancel location message and forwarding the cancel location message to a VLR previously serving the mobile subscriber.

29. The method of claim 28 comprising, in response to the second location update message, delaying sending of a cancel location message to a previously serving VLR to account for the mobile subscriber moving back into an area of a currently serving VLR.

30. A network routing node for providing gateway location register (GLR) functionality and for routing messages in a mobile communications network, the routing node comprising:
   (a) a communications module for sending and receiving signaling messages in a mobile communications network;
   (b) a location register caching application operatively associated with the communications module and being separate from a home location register (HLR) and a visitor location register (VLR) and located in a communication path between the HLR and the VLR for identifying signaling messages transmitted between the HLR and the VLR related to the location or subscription of a mobile subscriber, extracting mobile subscriber information from a first type of the identified signaling messages, and generating response messages responding to a second type of the identified signaling messages using the extracted information;
   (c) a location register cache for temporarily storing and providing access to mobile subscriber specific information extracted from the identified signaling messages of the first type; and (d) a routing module operatively associated with the communications module for routing the response messages generated by the location register caching application to a destination, wherein the location register caching application is adapted to receive a ProvideRoamingNumber message generated by the HLR in response to a request for routing information for a mobile terminated call to the subscriber and to perform a lookup in the location register cache to identify serving MSC and VLR information for the subscriber.

31. The network routing node of claim 30 wherein the communications module comprises a link interface module (LIM).

32. The network routing node of claim 30 wherein the communications module is a data communications module (DCM).

33. The network routing node of claim 30 wherein the first type of identified signaling messages includes first MAP UpdateLocation messages generated in response to a first change in location of a mobile subscriber and an insert subscriber data message generated in response to the first MAP UpdateLocation messages and wherein the second type of identified messages includes MAP UpdateLocation messages generated in response to changes in location of the mobile subscriber after the first change in location.

34. The network routing node of claim 30 wherein the first type of identified signaling messages includes MAP LocationUpdate messages including mobile subscriber roaming number information and the second type of identified signaling messages includes MAP ProvideRoamingNumber messages requesting the mobile subscriber roaming number information.

35. The network routing node of claim 30 wherein the second type of signaling messages includes LocationCancel message and the location register caching application is adapted to replicate the LocationCancel messages to multiple VLRs.

36. The network routing node of claim 30 wherein the location register cache includes an HLR cache for storing information conventionally stored by an HLR and a VLR cache for storing information conventionally stored by a VLR.

37. The network routing node of claim 30 comprising a provisioning platform for synchronizing the location register cache with a location register cache in a mated routing node.

38. The network routing node of claim 30 wherein the routing module is adapted to route the response messages generated by the location register caching application to the HLR or the VLR.

39. A method for mobile subscriber location management and for routing messages in a mobile communications network environment, the method comprising:
  in a routing node separate from a home location register (HLR) and a visitor location register (VLR) and being located in a communication path between the HLR and the VLR:
  (a) receiving a signaling message directed toward the HLR originating from the VLR related to a change in location of a mobile subscriber;
  (b) generating a response message to the VLR on behalf of the HLR using cached information related to the mobile subscriber without forwarding the signaling message to the HLR;
  (c) sending the response message to the VLR; and
  (d) receiving a ProvideRoamingNumber message from the HLR in response to a request for routing information for a mobile terminated call to the subscriber and using the cached information to identify serving MSC and VLR information for the subscriber.

40. A method for mobile subscriber location management and for routing messages in a mobile communications network environment, the method comprising:
  in a routing node separate from a home location register (HLR) and a visitor location register (VLR) and being located in a communication path between the HLR and the VLR:
  (a) receiving a signaling message directed toward the VLR originating from the HLR related to a change in location of a mobile subscriber;
  (b) generating a response message to the HLR on behalf of the VLR using cached information related to the mobile subscriber without forwarding the signaling message to the VLR;
  (c) sending the response message to the; and
  (d) receiving a ProvideRoamingNumber message from the HLR in response to a request for routing information for a mobile terminated call to the subscriber and using cached location information to identify serving MSC and VLR information for the subscriber.

* * * * *